(12) United States Patent
Kim et al.

(10) Patent No.: US 9,260,316 B2
(45) Date of Patent: Feb. 16, 2016

(54) TITANIUM DIOXIDE NANOPARTICLE, TITANATE, LITHIUM TITANATE NANOPARTICLE, AND PREPARATION METHODS THEREOF

(71) Applicant: POSCO, Gyeongsangbuk-do (KR)

(72) Inventors: Dong Hyun Kim, Gyeongsangbuk-do (KR); Jhi-Yong Kim, Gyeongsangbuk-do (KR); Juno Seok, Gyeongsangbuk-do (KR); Seok-Mo Chung, Gyeongsangbuk-do (KR); Jong Hoon Son, Gyeongsangbuk-do (KR)

(73) Assignee: POSCO, Pohang (KR)

( * ) Notice: Subject to any disclaimer, the term of this patent is extended or adjusted under 35 U.S.C. 154(b) by 0 days.

(21) Appl. No.: 14/369,555

(22) PCT Filed: Dec. 27, 2012

(86) PCT No.: PCT/KR2012/011529
§ 371 (c)(1),
(2) Date: Jun. 27, 2014

(87) PCT Pub. No.: WO2013/100608
PCT Pub. Date: Jul. 4, 2013

(65) Prior Publication Data
US 2014/0363368 A1 Dec. 11, 2014

(30) Foreign Application Priority Data

Dec. 29, 2011 (KR) .................. 10-2011-0145368

(51) Int. Cl.
| | | |
|---|---|---|
| C01G 23/047 | (2006.01) | |
| C01G 23/00 | (2006.01) | |
| C01D 15/00 | (2006.01) | |
| C01G 23/053 | (2006.01) | |
| H01M 4/485 | (2010.01) | |
| B82Y 40/00 | (2011.01) | |
| B82Y 30/00 | (2011.01) | |
| H01M 10/052 | (2010.01) | |

(52) U.S. Cl.
CPC .............. *C01G 23/005* (2013.01); *C01D 15/00* (2013.01); *C01G 23/0536* (2013.01); *H01M 4/485* (2013.01); *B82Y 30/00* (2013.01); *B82Y 40/00* (2013.01); *C01P 2002/04* (2013.01); *C01P 2002/10* (2013.01); *C01P 2002/72* (2013.01); *C01P 2002/90* (2013.01); *C01P 2004/03* (2013.01); *C01P 2004/04* (2013.01); *C01P 2004/13* (2013.01); *C01P 2004/62* (2013.01); *C01P 2004/64* (2013.01); *H01M 10/052* (2013.01); *Y02E 60/122* (2013.01); *Y10T 428/2982* (2015.01)

(58) Field of Classification Search
CPC .................. C01G 23/047; C01G 23/0536
USPC .................. 423/610–612; 977/773, 776
See application file for complete search history.

(56) References Cited

U.S. PATENT DOCUMENTS

| | | | | |
|---|---|---|---|---|
| 6,001,326 | A | * 12/1999 | Kim .................. | C01G 23/0536 423/598 |
| 2006/0115411 | A1 | 6/2006 | Jensen et al. | |
| 2006/0233697 | A1* | 10/2006 | Zhou ..................... | B82Y 30/00 423/610 |
| 2011/0269025 | A1 | 11/2011 | Sun et al. | |
| 2013/0039844 | A1 | 2/2013 | Thompson | |

FOREIGN PATENT DOCUMENTS

| | | |
|---|---|---|
| CN | 101955222 A | 1/2011 |
| JP | 10-245226 | 9/1998 |
| JP | 11-349330 | 12/1999 |
| JP | 2009-67655 | 4/2009 |
| JP | 2012-096965 | 5/2012 |
| KR | 10-2000-0008868 | 2/2000 |
| KR | 10-2001-0085139 | 9/2001 |
| KR | 10-2002-0031359 A | 5/2002 |
| KR | 10-2004-0105086 A | 12/2004 |
| KR | 10-2005-0023552 | 3/2005 |
| KR | 10-0594634 | 7/2006 |
| KR | 10-2008-0101993 | 11/2008 |
| KR | 10-2010-0083730 | 7/2010 |
| WO | WO 2009/029856 A1 | 3/2009 |
| WO | WO 2012/147856 A1 | 11/2012 |

OTHER PUBLICATIONS

Sibu, Sol-Gel Nanocrystalline Catalytic Titania Powders and Functional Coatings, Thesis submitted to the Cochin University of Science and Technology (2004), Ceramic Technology Division, Regional Research Laboratory (CSIR), Jun. 2004.
Pottier et al., Size tailoring of $TiO_2$ anatase nanoparticles in aqueous medium and synthesis of nanocomposites. Characterization by Raman spectroscopy, Journal of Materials Chemistry, 2003.
Ohtani et al., Photocatalytic Activity of Amorphous-Anatase Mixture of Titanium(IV) Oxide Particles Suspended in Aqueous Solutions, J. Phys. Chem B, 1997.
G. Xiang et al., "Large-scale synthesis of metastable $TiO_2(B)$ nanosheets with atomic thickness and their photocatalytic properties", Chem. Commun., vol. 46, pp. 6801-6803 (2010).
M. A. Grela et al., "Photon Energy and Photon Intermittence Effects on the Quantum Efficiency of Photoinduced Oxidations in Crystalline and Metastable $TiO_2$ Colloidal Nanoparticles", J. Phys. Chem. B., vol. 103, pp. 2614-2619 (1999).
International Search Report from the Korean Intellectual Property Office for International Application No. PCT/KR2012/011529 mailed Apr. 30, 2013.

\* cited by examiner

*Primary Examiner* — Anthony J Zimmer
(74) *Attorney, Agent, or Firm* — Finnegan, Henderson, Farabow, Garrett & Dunner, L.L.P.

(57) ABSTRACT

The present invention relates to titanium dioxide nanoparticles, titanate, lithium titanate nanoparticles, and preparation methods thereof. According to the present invention, titanium dioxide nanoparticles having a quasicrystalline phase corresponding to an intermediate form between a crystalline phase and an amorphous phase may be provided.

2 Claims, 6 Drawing Sheets

[One-dimensional titanate according to Example 2]

[Titanate prepared using P-25]

TITANIUM DIOXIDE NANOPARTICLE, TITANATE, LITHIUM TITANATE NANOPARTICLE, AND PREPARATION METHODS THEREOF

TECHNICAL FIELD

The present invention relates to titanium dioxide nanoparticles, titanate, lithium titanate nanoparticles, and preparation methods thereof.

BACKGROUND ART

Crystalline titanium dioxide nanoparticles generally having an average particle size of 50 nm or less, which is a representative material for a photo-catalyst, have been spotlighted as a new energy environmental material having characteristics such as decomposition of a harmful ingredient, an antibiotic property, deodorization, and the like, using ultraviolet (UV) light as an energy source. Recently, raw materials and usage of the crystalline titanium dioxide nanoparticles as described above have been rapidly developed.

A general preparation method of titanium dioxide may be divided as follows.

A sulfuric acid method is a method of sintering titanium dioxide obtained by pyrolyzing an aqueous $TiOSO_4$ solution at 800 to 1000° C. to grow particles to thereby obtain $TiO_2$ particles having a desired size. In the case of the sulfuric acid method, waste sulfuric acid may be generated during a process, thereby causing an environmental problem, and microfine titanium dioxide particles may be prepared by physical grinding, but titanium dioxide particles of which purity is deteriorated due to impurities may be produced. Therefore, the sulfuric acid method may not be used for a raw material for storing energy or a precise material for a multilayer ceramic capacitor (MLCC), or the like.

A hydrochloric acid method is a method of reacting heated $TiCl_4$ vapor with heated oxygen to form $TiO_2$ particles in a high temperature vapor phase. In the case of the hydrochloric acid method, since precipitated particles formed by a high temperature reaction are used, only particles having a rutile crystalline phase are prepared, expensive equipment for collecting hydrochloric acid gas and a chlorine control technology are required, and a risk due to hydrochloric acid gas in the process may be high.

Otherwise, there are methods of using alkoxides or high temperature vapor phases such as a sol-gel method, a spray flame method, and a chemical vapor deposition method, but these methods are not significantly useful due to a high process cost and low productivity.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a preparation method of titanium dioxide nanoparticles having a quasicrystalline phase having advantages of adjusting a particle size of particles to freely change physical and/or electrochemical properties.

Technical Solution

The present invention has been made in an effort to provide improved titanate and lithium titanate nanoparticles using the titanium dioxide nanoparticles as described above.

An exemplary embodiment of the present invention provides titanium dioxide nanoparticles having a quasicrystalline phase, which is an intermediate form between a crystalline phase and an amorphous phase.

A main x-ray diffraction (XRD) peak of the quasicrystalline phase may be shifted and broadened as compared to the crystalline phase.

The quasicrystalline phase may have a full width at half maximum (FWHM) of 1.9 to 2.5.

The main x-ray diffraction (XRD) peak of the quasicrystalline phase may be shifted as compared to a main peak of an anatase crystalline phase, such that 2θ may satisfy the following equation: $23° \leq 2\theta \leq 26°$.

The main x-ray diffraction (XRD) peak of the quasicrystalline phase may be shifted as compared to a main peak of a rutile crystalline phase, such that 2θ may satisfy the following equation: $26° \leq 2\theta \leq 29°$.

The particles may have an average particle size of 150 nm or less.

Another exemplary embodiment of the present invention provides a preparation method of titanium dioxide nanoparticles, including: (a) mixing a $TiCl_4$ solution and water to prepare $TiOCl_2$ in a jelly form; and (b) obtaining titanium dioxide nanoparticles having a quasicrystalline phase corresponding to an intermediate form between a crystalline phase and an amorphous phase through a hydrothermal reaction of mixing $TiOCl_2$ having the jelly form with water, wherein in step (a), an amount of water is controlled so that a concentration of $Ti^{3+}$ ions becomes 0.1 to 1.3 M, and in step (b), an amount of water is controlled so that a concentration of $Ti^{3+}$ ions becomes 1.5 to 4.3 M.

The hydrothermal reaction in step (b) may be a reaction performed by heating to a temperature of 50 to 200° C.

Another exemplary embodiment of the present invention provides a one-dimensional titanate prepared by a reaction between titanium dioxide nanoparticles having a quasicrystalline phase corresponding to an intermediate form between a crystalline phase and an amorphous phase with an alkali solution.

The one-dimensional titanate may have a nanotube, a nanosheet, a nanowire, or a nanorod shape.

Another exemplary embodiment of the present invention provides a preparation method of titanate including reacting the titanium dioxide nanoparticles prepared by the method as described above with a 5 M to 25 M aqueous alkali solution to obtain one-dimensional titanate.

The aqueous alkali solution may contain at least one of LiOH, KOH, and NaOH.

The reaction between the titanium dioxide nanoparticles and the aqueous alkali solution may be performed at 80 to 350° C. for 6 to 20 hours.

Another exemplary embodiment of the present invention provides lithium titanate nanoparticles prepared by a reaction between the one-dimensional titanate as described above and lithium hydroxide (LiOH).

Another exemplary embodiment of the present invention provides a preparation method of lithium titanate nanoparticles including reacting titanate prepared by the method as described above with 10 to 30 mol of lithium hydroxide (LiOH) and heating the reactant to 400 to 1200° C.

Advantageous Effects

According to an embodiment of the present invention, a preparation method of titanium dioxide nanoparticles capable of organically controlling a size of nanoparticles and preparing one-dimensional nanoparticles to thereby significantly improve properties of a material for storing energy may be provided.

Therefore, improved titanium dioxide nanoparticles, titanate, lithium titanate nanoparticles, and preparation methods thereof may be provided.

DESCRIPTION OF THE DRAWINGS

FIG. 4 (a) to (d) are scanning electron microscope photographs of titanate prepared using titanium dioxide particles having various crystalline properties.

MODE FOR INVENTION

Hereinafter, exemplary embodiments of the present invention will be described in detail. However, the exemplary embodiments are described for illustrative purposes, and the present invention is not limited thereto. Therefore, the present invention will be defined by the scope of the appended claims to be described below.

An exemplary embodiment of the present invention provides titanium dioxide nanoparticles having a quasicrystalline phase, which is an intermediate form between a crystalline phase and an amorphous phase.

In the case of using the titanium dioxide nanoparticles having the quasicrystalline phase as in an exemplary embodiment of the present invention, one-dimensional titanate may be prepared. A detailed description thereof will be omitted.

A main XRD peak of the quasicrystalline phase may be shifted and broadened as compared to the crystalline phase.

More specifically, the quasicrystalline phase may have a full width at half maximum (FWHM) of 1.9 to 2.5.

More specifically, the main XRD peak of the quasicrystalline phase may be shifted as compared to a main peak of an anatase crystalline phase, such that $2\theta$ may satisfy the following equation: $23° \leq 2\theta \leq 26°$.

More specifically, the main XRD peak of the quasicrystalline phase may be shifted as compared to a main peak of a rutile crystalline phase, such that $2\theta$ may satisfy the following equation: $26° \leq 2\theta \leq 29°$.

Characteristics of the peak as described above may be due to a decrease of crystallinity in accordance with an increase of an amount of amorphous phases as compared to a reference crystalline structure (anatase or rutile).

The particles may have an average particle size of 150 nm or less. More specifically, the particles may have an average particle size of 10 to 150 nm or 10 to 50 nm. With the preparation method of titanium dioxide nanoparticles according to another exemplary embodiment of the present invention, the particle size may be adjusted as described above. The particle size of the titanium dioxide particle may be adjusted according to desired electrical and/or chemical properties.

Another exemplary embodiment of the present invention provides a preparation method of titanium dioxide nanoparticles including: (a) mixing a $TiCl_4$ solution and water to prepare $TiOCl_2$ in a jelly form; and (b) obtaining titanium dioxide nanoparticles having a quasicrystalline phase corresponding to an intermediate form between a crystalline phase and an amorphous phase through a hydrothermal reaction of mixing $TiOCl_2$ having the jelly form with water, wherein in step (a), an amount of water is controlled so that a concentration of $Ti^{3+}$ ions becomes 0.1 to 1.3 M, and in step (b), an amount of water is controlled so that a concentration of $Ti^{3+}$ ions becomes 1.5 to 4.3 M.

The hydrothermal reaction in step (b) may be a reaction performed by heating to a temperature to 50 to 200° C.

In step (a), in the case in which the amount of water is controlled so that the concentration of $Ti^{3+}$ ions becomes 0.1 to 1.3 M, $TiOCl_2$ having a jelly form may be prepared.

In the case in which the concentration is less than 0.1 M, the concentration of $Ti^{3+}$ ions is insufficient such that a water-soluble solid may not be formed, and in the case in which the concentration is more than 1.3 M, a $TiOCl_2$ solid may be formed, such that a water soluble property may not be implemented.

The prepared $TiOCl_2$ having the jelly form is stable at room temperature, and Ti ions in the prepared $TiOCl_2$ having the jelly form are trivalent ions.

The titanium dioxide nanoparticles having a quasicrystalline phase corresponding to the intermediate form between the crystalline phase and the amorphous phase may be obtained through the hydrothermal reaction of mixing $TiOCl_2$ having the jelly form with water.

The hydrothermal reaction mixing $TiOCl_2$ having the jelly form with water may include removing stable chloride ions and hydrochloric acid.

Since the $TiOCl_2$ having the jelly form is stable at room temperature, in the case of reacting $TiOCl_2$ with a small amount of water, the form of the $TiOCl_2$ having the jelly form is changed into an aqueous solution phase. At the time of the reaction, $Ti^{3+}$ ions are precipitated as titanium dioxide particles by reaction with insufficient oxygen. In this case, a meta-stable crystalline phase instead of the crystalline phase is obtained.

In addition, at the time of reaction with water, chloride ions float in the aqueous solution except for the precipitates. In this case, a trace amount of hydrochloric acid gas may be generated by floating of the chloride ions.

The entire reaction formula is as follows.

$TiCl_4+H_2O[\text{insufficient}] \rightarrow TiOCl_2 \text{liquidsolidjelly}+$
$H_2O[\text{insufficient}] \rightarrow TiO_2[\text{metalstablestate}]+HCl$
$[\text{liquid}]+HCl[\text{gas}]+H_2O$  [Reaction Formula 1]

In this reaction, the concentration of the $Ti^{3+}$ ion may be 1.5 to 4.3 M.

In the case in which the concentration is less than 1.5 M, the reaction between the $Ti^{3+}$ Ions and oxygen is not conducted such that precipitation is not generated, and in the case in which the concentration is more than 4.3 M, the reaction between the $Ti^{3+}$ ions and oxygen is explosively conducted such that titanium dioxide having a rutile crystalline phase may be formed.

In this process, a basic solution for diluting the HCl solution is not added, and the chloride ions and chlorine gas may be removed only by a water reaction.

Meanwhile, in this process, a precipitation reaction may be performed while changing a temperature of the aqueous solution at 50 to 200° C.

As a specific example, a rutile phase may be formed at 50 to 90° C., and an anatase phase may be formed at 90 to 150° C. In addition, composite particles containing the anatase and rutile phases may be prepared at 150 to 200° C.

The phase change according to the temperature is due to activation energy of the $Ti^{3+}$ ions.

In the prepared titanium dioxide ($TiO_2$) precipitate, the HCl solution, and the floating chloride, the titanium dioxide ($TiO_2$) precipitate may be allowed to remain by filtering, and then the aqueous solution may be removed.

Distilled water may be used in order to wash the $TiO_2$ precipitate.

Final titanium dioxide nanoparticles may be prepared by filtering the $TiO_2$ precipitate using a filter paper having a pore size of 0.05 µm or less and drying at 60° C. or less.

Another exemplary embodiment of the present invention may provide one dimensional titanate prepared by a reaction between titanium dioxide nanoparticles having a quasicrystalline phase corresponding to an intermediate form between a crystalline phase and an amorphous phase with an alkali solution.

The one-dimensional titanate may have a nanotube, nanosheet, nanowire, or nanorod shape. However, the present invention is not limited thereto.

In the case in which the one-dimensional titanate as described above is used as an energy material (for example, an anode material of a secondary battery), electrical properties may be improved.

The one-dimensional titanate may be obtained by reacting the titanium dioxide nanoparticles prepared by the method according to an exemplary embodiment of the present invention as described above with a 5 to 25 M aqueous alkali solution.

In the case in which a concentration of the aqueous alkali solution is less than 5 M, it is impossible to break a Ti—O—Ti bond, and in the case in which the concentration is more than 25 M, the Ti—O—Ti bond may be completely broken, such that the nanoparticles are in an amorphous state.

The aqueous alkali solution may contain at least one of LiOH, KOH, and NaOH.

Further, the reaction between the titanium dioxide nanoparticles and the aqueous alkali solution may be performed at 80 to 350° C. for 6 to 20 hours.

In the case in which a reaction temperature is less than 80° C., one-dimensional nanoparticles may not be prepared due to a decrease in activation energy of layered Ti—O—Ti formed by cleavage of the Ti—O—Ti bond for imparting surface energy, and in the case in which the reaction temperature is more than 350, the one-dimensional property may be lost, and the nanoparticles are changed again into spherical nanoparticles due to excessive activation energy.

The titanium dioxide nanoparticles and the aqueous alkali solution may react with each other at a weight ratio of 8:2 to 6:4. The ratio may be effective for preparing one-dimensional titanate.

Another exemplary embodiment of the present invention provides lithium titanate nanoparticles prepared by a reaction between the one-dimensional titanate according to an exemplary embodiment of the present invention as described above and lithium hydroxide (LiOH).

The lithium titanate nanoparticles may be prepared by a preparation method of reacting the titanate according to an exemplary embodiment of the present invention as described above with 10 to 30 mol of lithium hydroxide (LiOH) and then heating the reactant to 400 to 1200° C.

In the case of satisfying the above-mentioned range, lithium titanate may be effectively prepared.

The lithium titanate may be used as an anode active material of a lithium secondary battery.

Hereinafter, examples of the present invention and comparative examples will be described. However, the following examples are only examples of the present invention, and the present invention is not limited thereto.

Example 1

Preparation of Titanium Dioxide Nanoparticles 500 ml of a $TiCl_4$ solution (97% or more) was added to 3500 ml of distilled water while slowly reacting with distilled water so that a concentration of $Ti^3$ ion was 0.9 M.

In this case, stable Ti ions formed $Ti^{4+}$ ions, thereby finally forming $TiCl_4$. However, in the case in which water was insufficient for reaction with chloride ions, Ti cations were divided such that $Ti^{3+}$ ions reacted with water.

The reactant formed a water soluble $TiOCl_2$ solid due to a rapid nuclear reaction. After maintaining the reaction, water was added so that the concentration of $Ti^{3+}$ ions was 3.2 M, followed by stirring, thereby preparing an aqueous $TiOCl_2$ solution.

A most ideal molality for preparing the aqueous $TiOCl_2$ solution was 3.2 M, but the aqueous $TiOCl_2$ solution may be prepared at a concentration of 1.5 to 4.3 M.

In this case, a precipitation reaction was conducted while changing a stirrer temperature to 50 or 100° C. After conducting the precipitation reaction for 1 hour, the precipitated $TiO_2$ precipitates were filtered from the precipitates and the aqueous solution using a filter paper having a pore size of 0.05 µm, and then chloride ions and remaining HCl were removed using distilled water.

Example 2

Preparation of One-Dimensional Titanate

One-dimensional titanate was prepared by reacting the titanium dioxide prepared in Example 1 with 10 M NaOH at various temperatures and/or for various times.

Example 3

Preparation of Lithium Titanate

Lithium titanate was prepared by heat treating the one-dimensional titanium dioxide nanotubes prepared in Example 2 and LiOH at 40 to 1200° C.

Example 4

Manufacturing of Coin-Type Half Cell

An anode slurry was prepared by mixing the lithium titanate prepared in Example 3 as an anode active material, ketjen black as a conducting material, and polyvinylidene fluoride (PVdF) as a binder with each other at a weight ratio of 90:2:8, and then mixing the mixture with N-methyl-2-pyrrolidone (NMP) used as a solvent. After the prepared anode slurry was applied onto one surface of a copper current collector and dried at about 130° C. for 2 hours, an anode having a size of 1.4875 $cm^2$ was prepared.

A 1 M $LiPF_6$ non-aqueous electrolyte was prepared by mixing ethylene carbonate (EC) and diethyl carbonate (DEC) with each other at a volume ratio of 1:2, and adding $LiPF_6$ to the non-aqueous electrolyte solvent.

A coin-type half cell was manufactured by using lithium metal foil as a cathode, interposing a polyolefin separator between both electrodes, and then injecting the electrolyte.

Experimental Example 1

Transmission Electron Microscope Photograph of Titanium Dioxide Nanoparticles

Figure 1:
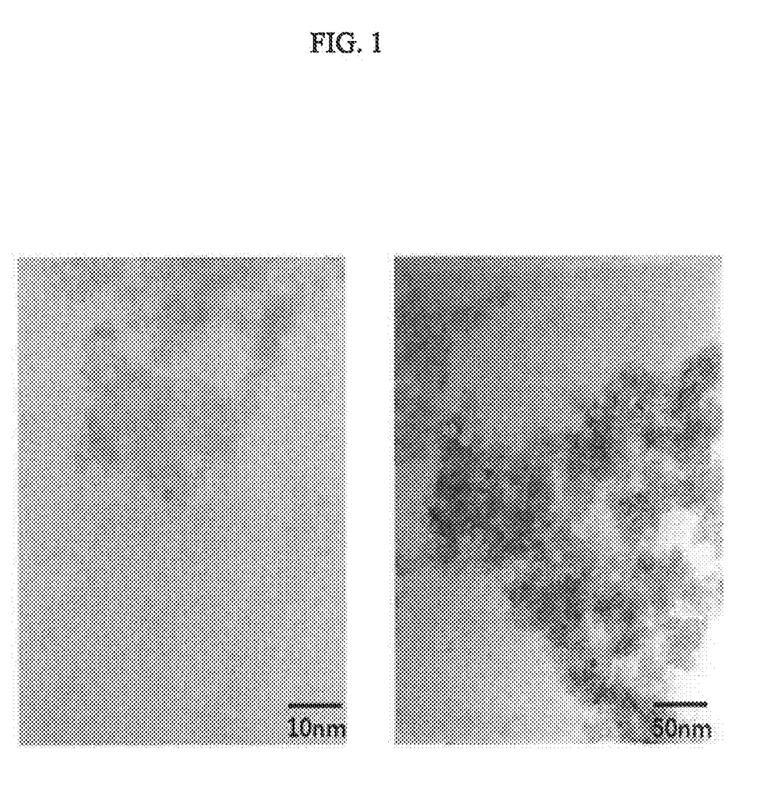
FIG. 1 shows transmission electron microscope photographs of titanium dioxide nanoparticles according to Example 1.

FIG. 1 shows transmission electron microscope photographs of titanium dioxide nanoparticles according to Example 1. As shown in FIG. 1, it may be appreciated that the titanium dioxide nanoparticles had a particle size of about 10 to 50 nm.

Experimental Example 2

XRD Peak Result of Titanium Dioxide

Figure 2:
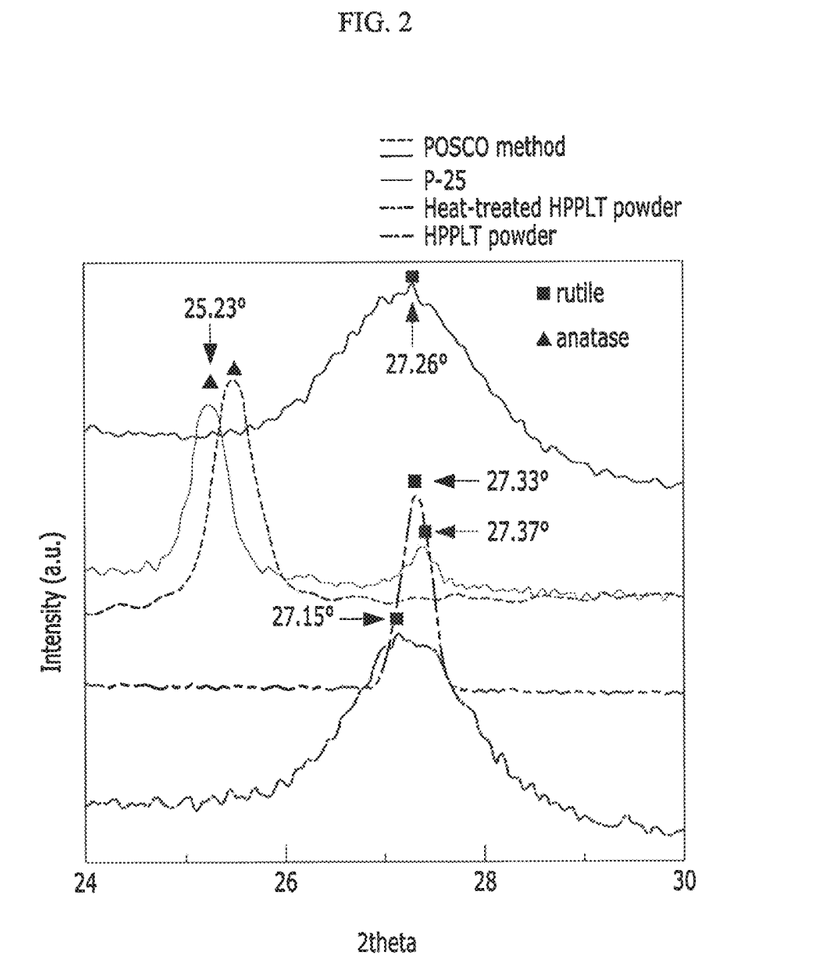
FIG. 2 shows an x-ray diffraction (XRD) peak of the titanium dioxide nanoparticles according to Example 1.

FIG. 2 shows an x-ray diffraction (XRD) peak of the titanium dioxide nanoparticles according to Example 1.

For comparison with the peak of the titanium dioxide nanoparticles according to Example 1, the XRD results of the titanium dioxide nanoparticles according to Example 1 are shown in FIG. 2 together with XRD results of P-25 (Deggusa Co. Ltd), which is a commercialized powder), powder (Ishihara Corp.) prepared using an existing low temperature uniform precipitation method, and powder obtained by heat-treating the powder (Ishihara Corp.) prepared using the existing low temperature uniform precipitation method.

In FIG. 2, the POSCO method indicates a peak of titanium dioxide nanoparticles according to Example 1, P-25 indicates a peak of the P-25 (Deggusa Co. Ltd), which is a commercialized powder, HPPLT powder indicates a peak of the powder (Ishihara Corp.) prepared using the existing low temperature uniform precipitation method, and Heat-treated HPPLT powder indicates a peak of the powder obtained by heat-treating the powder (Ishihara Corp.) prepared using the existing low temperature uniform precipitation method.

As shown in FIG. 2, it may be confirmed that in the case of titanium dioxide prepared by the existing method, crystallinity was maintained, but in the case of the nanoparticles according to Example 1, the peak was broadened and a central peak was shifted due to a quasicrystalline phase.

In more detail, it may be confirmed that the XRD peak was shifted by formation of the quasicrystalline phase as compared to the power prepared by the existing low temperature uniform precipitation method used as a reference powder having a rutile crystalline phase. In addition, it may be confirmed that the XRD peak was shifted as compared to P-25 (Deggusa Co. Ltd) used as a reference powder having an anatase crystalline phase. The reason of this shift of the XRD peak is that crystallinity disappeared due to an increase in an amount of the amorphous phase as compared to the crystalline structure by formation of the quasicrystalline phase.

Experimental Example 3

Scanning Electron Microscope Photograph of One-Dimensional Titanate

Figure 3:
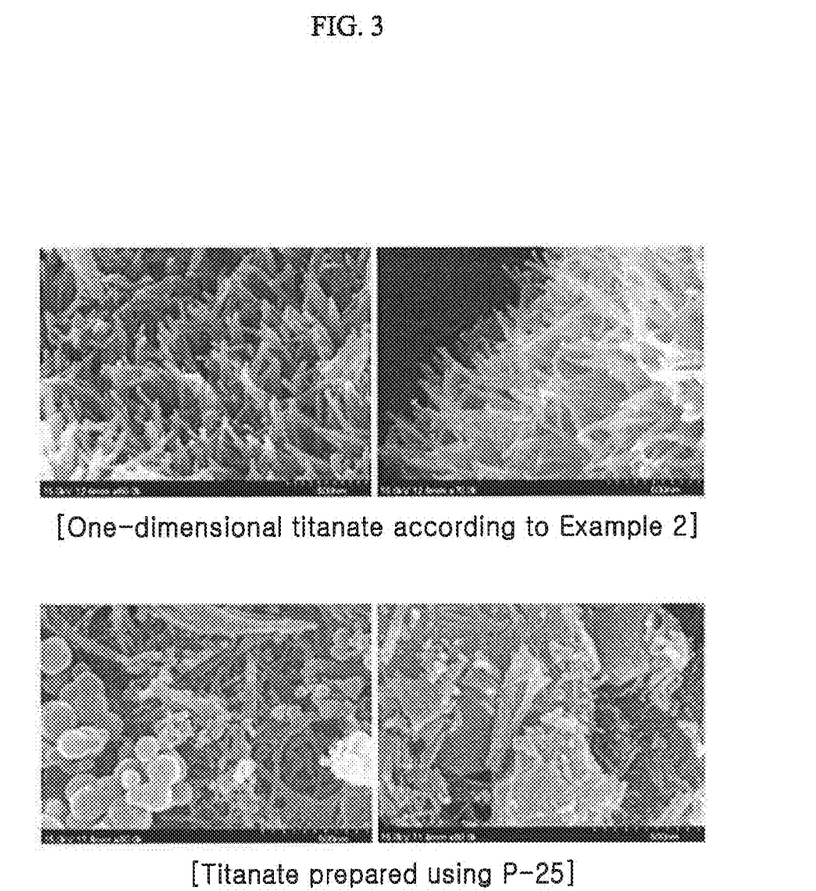
FIG. 3 shows scanning electron microscope photographs of one-dimensional titanate according to Example 2.

FIG. 3 shows scanning electron microscope photographs of one-dimensional titanate according to Example 2.

For comparison with Example 2, scanning electron microscope photographs of titanate prepared by the same method as in Example 2 using P-25 (Deggusa Co. Ltd), which is the commercialized powder, are shown in FIG. 3 together with the photographs according to Example 2.

As shown in FIG. 3, it may be confirmed that since the nanoparticles according to Example 2 had the quasicrystalline phase, the nanoparticles were easily dissolved in the alkali solution, such that one-dimensional particles were easily formed, but in the case of using the commercialized powder, a small amount of one-dimensional titanium dioxide and spherical titanium dioxide complicatedly existed instead of one-dimensional titanium dioxide due to a decrease in solubility due to crystallinity.

Figure 4:
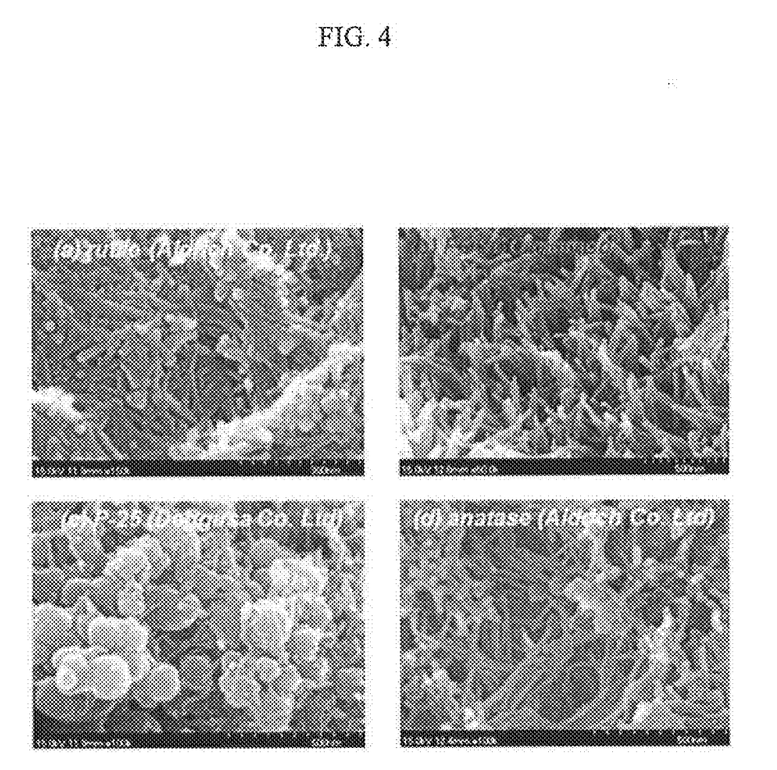

FIG. 4 (a) to (d) are transmission electron microscope photographs of titanate prepared using titanium dioxide particles having various crystalline properties.

In FIG. 4, (a) shows titanate (Aldrich Co. Ltd) using rutile titanium dioxide particles, (b) shows titanate according to Example 2 of the present invention, (c) shows titanate using P-25 (Deggusa Co. Ltd) titanium dioxide particles, and (d) shows titanate (Aldrich Co. Ltd) using anatase titanium dioxide particles.

As shown in FIG. 4 (a) to (d), it may be confirmed that in the case of using the commercialized powder, a one-dimensional material was not prepared due to a stable crystalline phase, but spherical titanium dioxide and one-dimensional material co-existed.

Particularly, it may be confirmed that even in the case of using the anatase particles, the rutile particles, and P-25 having an anatase/rutile composite phase consistently, the spherical titanium dioxide and one-dimensional material were complicatedly formed.

However, it may be confirmed that in the case of using titanium dioxide prepared in Example 2, a one-dimensional material having a nanotube shape was uniformly formed.

Experimental Example 4

Figure 5:
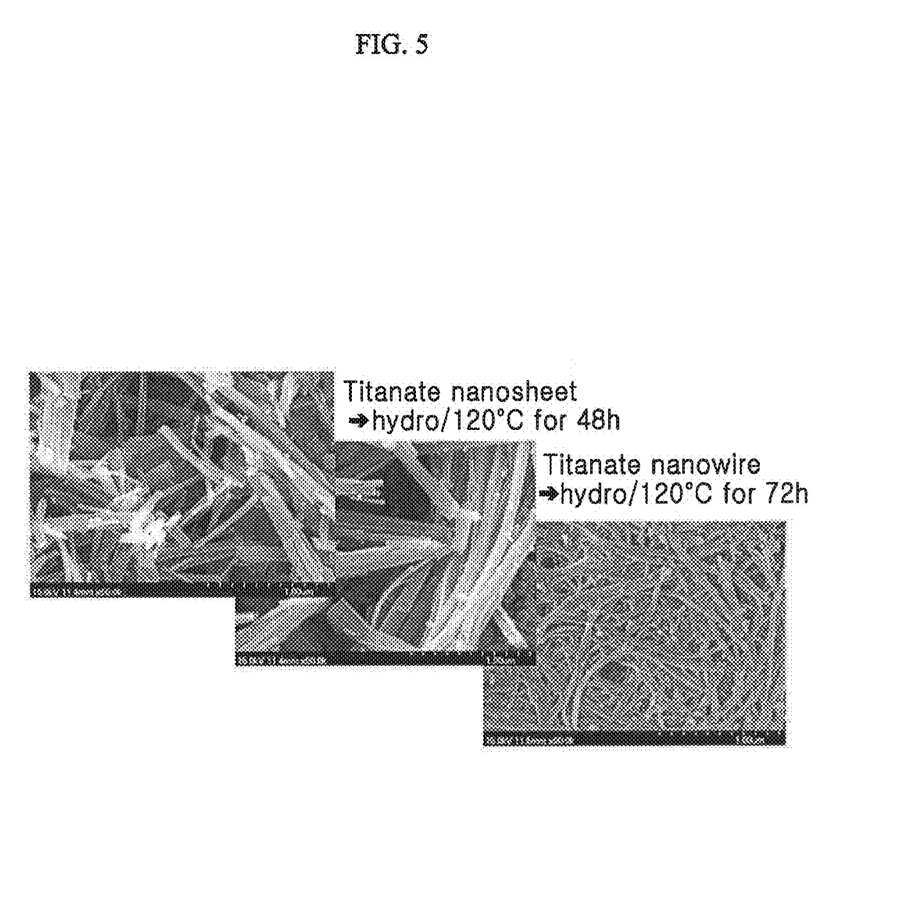
FIG. 5 shows scanning electron microscope photographs of titanate prepared while changing reaction conditions in Example 2.

Scanning Electron Microscope Photograph of One-Dimensional Titanate According to Reaction Condition FIG. 5 is scanning electron microscope photographs of titanate prepared while changing reaction conditions in Example 2. As shown in FIG. 5, it was confirmed that a one-dimensional shape was freely changed into a nanowire shape, a nanotube shape, a nanosheet shape, or the like according to a change of a thermal synthesis temperature and/or time.

Experimental Example 5

Evaluation of Characteristics of Coin-Type Half Cell

Figure 6:
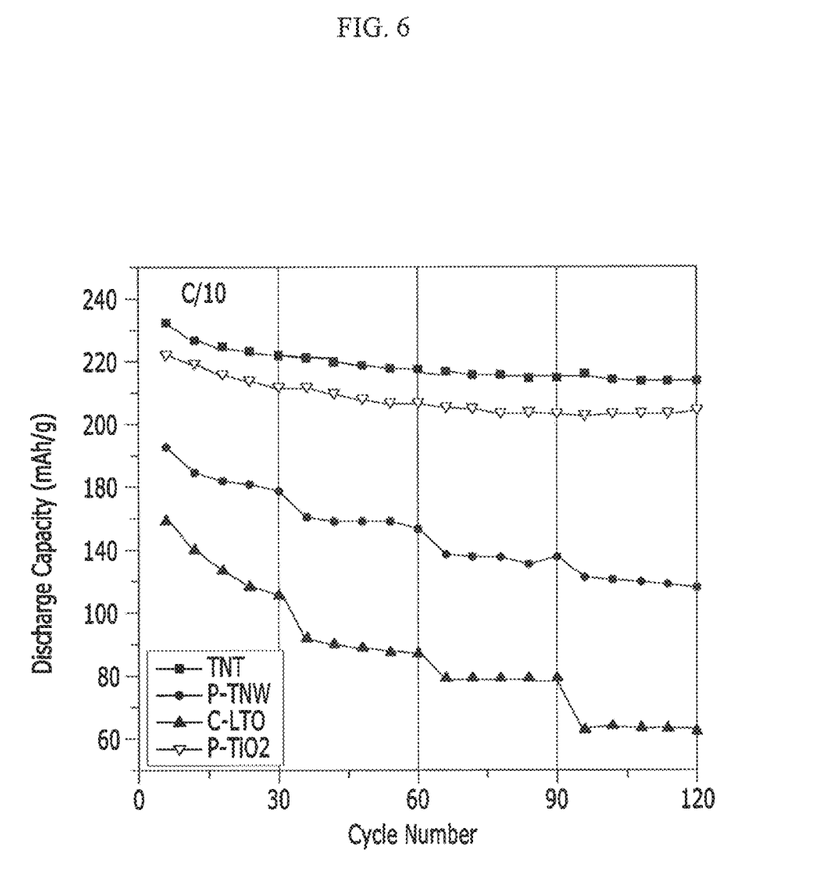
FIG. 6 shows data obtained by evaluating characteristics of a coin-type half cell according to Example 4.

FIG. 6 shows data obtained by evaluating characteristics of a coin-type half cell according to Example 4.

In FIG. 6, TNT Indicates titanate nanotubes of Example 2, p-TNW indicates commercialized titanate nanowires coated with pitch, p-$TiO_2$ indicates commercialized $TiO_2$ particles coated with pitch, and C-LTO indicates commercialized LTO particles.

As shown in FIG. 6, it may be confirmed that characteristics and lifespan of the coin-type half cell according to the examples of the present invention were improved as compared to the existing particles.

The reason for this result is that a sufficient space in which lithium may be sufficiently stored was present in an empty space in the one-dimensional nanotubes, which was due to a stable crystalline structure of the titanium dioxide nanotubes.

In lithium titanate prepared in examples of the present invention, a space in which lithium may be inserted may be sufficiently secured due to excellent crystallinity, and the stable crystalline phase may enable insertion and separation of lithium in spite of repeated insertion and separation of lithium, as compared to the existing lithium titanate.

The present invention is not limited to the exemplary embodiments but may be implemented in various forms, and those skilled in the art will appreciate that various modifications and alterations may be made without departing from the spirit or essential features of the present invention. Therefore, it should be understood that the above-mentioned embodiments are not restrictive but are exemplary in all aspects.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A preparation method of titanium dioxide nanoparticles, the preparation method comprising:
    a) mixing a $TiCl_4$ solution and water to prepare $TiOCl_2$ in a jelly form; and
    (b) obtaining titanium dioxide nanoparticles having a quasicrystalline phase corresponding to an intermediate form between a crystalline phase and an amorphous phase through a hydrothermal reaction of mixing $TiOCl_2$ having the jelly form with water,
    wherein in step (a), an amount of water is controlled so that a concentration of $Ti^{3+}$ ions becomes 0.1 to 1.3 M, and
    in step (b), an amount of water is controlled so that a concentration of $Ti^{3+}$ ions becomes 1.5 to 4.3 M.

2. The preparation method of claim 1, wherein
    the hydrothermal reaction in step (b) is a reaction performed by heating to a temperature of 50 to 200° C.

* * * * *